UNITED STATES PATENT OFFICE.

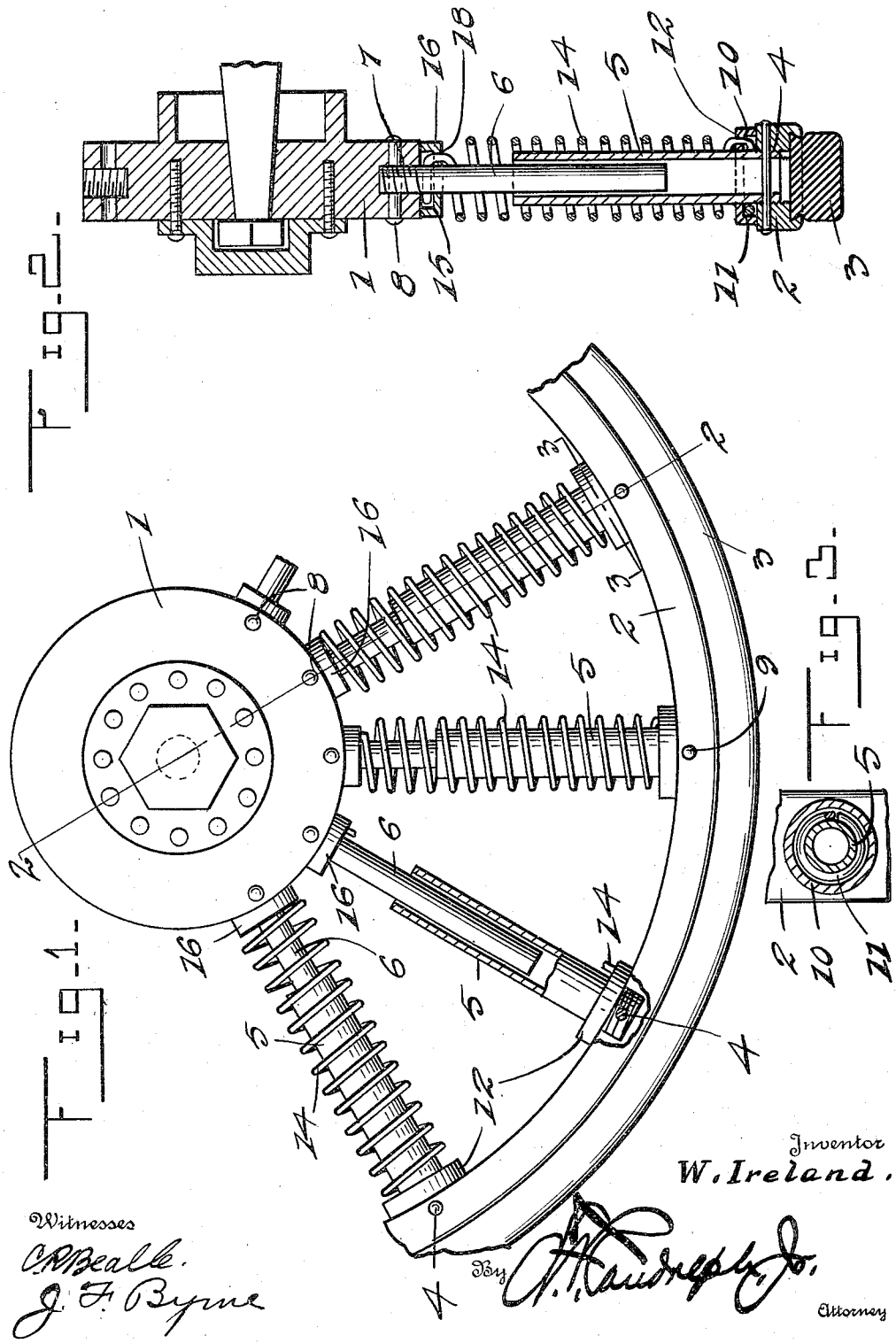

WALTER IRELAND, OF CINCINNATI, OHIO.

RESILIENT WHEEL.

1,151,467.  Specification of Letters Patent.  Patented Aug. 24, 1915.

Application filed October 29, 1914. Serial No. 869,264.

*To all whom it may concern:*

Be it known that I, WALTER IRELAND, a citizen of the United States, residing at Cincinnati, in the county of Hamilton and State of Ohio, have invented certain new and useful Improvements in Resilient Wheels; and I do hereby declare the following to be a full, clear, and exact description of the invention, such as will enable others skilled in the art to which it appertains to make and use the same.

This invention relates to resilient wheels and the primary object of the invention is to provide a resilient wheel which has a plurality of resilient shock absorbing spokes, for absorbing the shock occasioned to the periphery or tread of the wheel prior to their transmission to the hub of the wheel and axle of the vehicle upon which the wheel is mounted.

Another object of this invention is to provide a resilient wheel as specified which has telescoping spokes, about which are wound spiral springs, and further to provide washers welded to the telescoping sections of the spokes for retaining the ends of the spiral spring for preventing accidental displacement thereof.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a fragmentary view in side elevation of a part of a wheel constructed in accordance with this invention, showing one of the telescoping spokes in section. Fig. 2 is a sectional view on the line 2—2 of Fig. 1, and Fig. 3 is a cross sectional view on the line 3—3 of Fig. 1.

Referring more particularly to the drawing, 1 designates the hub of the wheel which is constructed in the ordinary manner having a spindle receiving bore formed centrally therein.

2 designates the felly of the wheel which has any suitable type of cushioning tire, preferably a solid rubber or resilient tire 3 mounted upon the periphery thereof.

The inner wall of the felly 2 of the wheel is provided with a plurality of circumferentially spaced openings 4 which receive the outer ends of tubes 5. The tubes 5 form sections of the spokes of the wheel and they are detachably connected to the felly 2 by being screw threaded into the bores 4 which are formed in the felly 2. The tubes 5 extend inwardly from the felly 2 toward the central axis of the hub 1 and have slidably seated therein rods or stems 6. The rods or stems 6 which, when taken in connection with the tubes or sleeves 5 form the spokes of the wheel are detachably connected to the hub 1 by screw threadably mounting their inner end into the hub as is clearly shown at 7 in Fig. 2 of the drawing. The rods 6 extend radially from the periphery of the hub and are slidably seated within the tubes or sleeves 5. The hub 1 has rivets 8 extending transversely therethrough, which rivets extend through the ends of the rods 6 which are seated within the hub for preventing the rods from working loose within the hub upon rotation of the wheel. The felly 2 is provided with rivets 9 which extend transversely therethrough and through the ends of the tubes 5 for preventing the accidental displacement of these tubes.

The sleeves 5 have washers 10 secured thereto in any suitable manner such as by welding, which washers are provided with annular recesses 11, and transversely extending openings 12 which communicate with the annular recesses 11. The sleeves 5 have coiled thereabout spiral springs 14, which springs have one of their ends inserted through the openings 12 and coiled about the sleeves within the annular recess 11 formed in the washers 10, for preventing accidental dislodgment of the spiral spring and also for securely attaching them to the sleeves. The springs 14 are also coiled about the rod 6 and their ends opposite to the ones which are inserted into the recesses 11, are inserted into recesses 15 which are formed in washer 16. The washers 16 are formed upon or welded to the rods 6 and abut the outer periphery of the hub 1 as is clearly shown in Figs. 1 and 2 of the drawings. The inserting of the ends of the spiral springs 14 into the washers or collars 16 is accomplished by the insertion of the end through openings 18 which are formed within the collars transversely to the annular recesses 15, and it tends to hold the springs permanently attached to the hub of the vehicle, while the collars 10 hold it attached to the rim, thereby providing a proficient shock absorbing member interposed between the hub 1 and the felly 2 of the wheel for absorbing shock occasioned during the travel of the wheel. The telescoping of the spokes which are composed of the rods 6 and the sleeves 5 will permit of the compression or expansion of the springs 14 under movement of the wheel felly as is necessary for the efficient shock absorbing thereby.

In assembling the wheel the telescoping spokes are put inside of the springs first, then the springs are twisted in the collars of the hub and the opposite ends are then inserted in the collars of the rim, this end of the spring being straight and long enough to prevent disarrangement by the tension of the spring. If the springs are made the proper length the tension of the spring will not be great enough to allow the springs to come out of engagement with the collars.

From the foregoing description taken in connection with the accompanying drawings the advantages of construction and of the method of operation of the improved resilient wheel will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

A resilient wheel comprising a hub, a felly extending circumferentially about said hub, a plurality of telescoping spokes connecting said hub and felly, spiral springs coiled about said telescoping spokes, a pair of washers each having an annular recess and a transverse opening communicating with said annular recess, one of said washers being secured to the upper part of one of said spokes and abutting the hub, the other washer being secured to the lower part of the spoke and abutting the felly, the ends of the coiled spring being adapted to be inserted through the transverse openings into said annular recess whereby said springs are held from displacement.

In testimony whereof I affix my signature in presence of two witnesses.

WALTER IRELAND.

Witnesses:
 WILLIAM H. IRELAND,
 WILLIAM C. RUMPKE.

Copies of this patent may be obtained for five cents each, by addressing the "Commissioner of Patents, Washington, D. C."